(12) United States Patent
Martin et al.

(10) Patent No.: US 11,597,029 B2
(45) Date of Patent: *Mar. 7, 2023

(54) WIRE SPOOL GUN

(71) Applicant: Forney Industries, Inc., Fort Collins, CO (US)

(72) Inventors: Samuel Z. Martin, Fort Collins, CO (US); Jason T. Mahugh, Windsor, CO (US); James J. Legoza, Fort Collins, CO (US)

(73) Assignee: Forney Industries, Inc., Fort Collins, CO (US)

( * ) Notice: Subject to any disclaimer, the term of this patent is extended or adjusted under 35 U.S.C. 154(b) by 733 days.

This patent is subject to a terminal disclaimer.

(21) Appl. No.: 16/678,272

(22) Filed: Nov. 8, 2019

(65) Prior Publication Data

US 2021/0046572 A1 Feb. 18, 2021

Related U.S. Application Data

(60) Provisional application No. 62/887,014, filed on Aug. 15, 2019.

(51) Int. Cl.
*B23K 9/29* (2006.01)
*B23K 9/12* (2006.01)
*B23K 9/173* (2006.01)
*B23K 9/133* (2006.01)
*B23K 9/16* (2006.01)

(52) U.S. Cl.
CPC ............. *B23K 9/295* (2013.01); *B23K 9/123* (2013.01); *B23K 9/125* (2013.01); *B23K 9/1336* (2013.01); *B23K 9/164* (2013.01); *B23K 9/173* (2013.01)

(58) Field of Classification Search
CPC ...... B23K 9/123; B23K 9/125; B23K 9/1333; B23K 9/1336; B23K 9/164; B23K 9/173; B23K 9/295; B23K 9/323; B23K 9/324
USPC .................................................. 219/137.31
See application file for complete search history.

(56) References Cited

U.S. PATENT DOCUMENTS

| D176,570 | S | 1/1965 | Taylor |
|---|---|---|---|
| 3,211,187 | A | 10/1965 | Paule et al. |
| 5,613,530 | A | 3/1997 | Kincel et al. |
| D379,008 | S | 4/1997 | Constantine et al. |
| 5,682,927 | A | 11/1997 | Takahashi et al. |
| 5,842,506 | A | 12/1998 | Peters |
| 6,064,036 | A | 5/2000 | Kensrue |
| 7,208,699 | B2 | 4/2007 | Stanzel |
| 7,299,829 | B2 | 11/2007 | Kim |

(Continued)

FOREIGN PATENT DOCUMENTS

| CH | 677462 A5 | 5/1991 |
|---|---|---|
| CN | 206153730 U | 5/2017 |

OTHER PUBLICATIONS

Office Action from corresponding Chinese patent application No. 2021102902251410, issued by National Intellectual Property Administration, PRC (CNIPA) dated Nov. 3, 2021.

(Continued)

*Primary Examiner* — Dana Ross
*Assistant Examiner* — James F Sims, III
(74) *Attorney, Agent, or Firm* — Holzer Patel Drennan

(57) ABSTRACT

A spool gun having a very unique look, due to its arrangement of external features. The spool gun has its wire spool compartment located below the handle and the user's hand, when the user is gripping the spool gun in an operational position. A gas/power cable is connected to the body of the spool gun forward of the handle.

19 Claims, 16 Drawing Sheets

(56) References Cited

U.S. PATENT DOCUMENTS

| | | | |
|---|---|---|---|
| 7,999,209 B2 | 8/2011 | Diekmann et al. | |
| 8,546,728 B2 | 10/2013 | Sickels | |
| 8,569,654 B2 | 10/2013 | Granato, Jr. et al. | |
| 8,766,141 B2 | 7/2014 | Stanzel et al. | |
| 8,952,294 B2 * | 2/2015 | Serio | B23K 9/173 219/137.31 |
| 9,004,114 B2 | 4/2015 | Kasahara et al. | |
| D736,603 S | 8/2015 | Petzl | |
| 9,272,357 B2 | 3/2016 | Granato, Jr. et al. | |
| D779,926 S | 2/2017 | Taylor | |
| D807,730 S | 1/2018 | Wu | |
| D863,041 S | 10/2019 | Short | |
| 10,590,666 B2 | 3/2020 | Itagaki et al. | |
| 11,103,915 B2 | 8/2021 | Bastoni | |
| 2004/0200819 A1 | 10/2004 | Kensrue | |
| 2005/0218129 A1 | 10/2005 | Kensrue et al. | |
| 2006/0022104 A1 | 2/2006 | Treat | |
| 2006/0207981 A1 | 9/2006 | Diekmann et al. | |
| 2008/0110354 A1 | 5/2008 | Itagaki et al. | |
| 2008/0197116 A1 | 8/2008 | Achtner et al. | |
| 2009/0078688 A1 * | 3/2009 | Giese | B23K 9/295 219/136 |
| 2013/0270498 A1 | 10/2013 | Burneister et al. | |
| 2015/0107066 A1 | 4/2015 | Lu | |
| 2015/0117975 A1 | 4/2015 | Wright | |

OTHER PUBLICATIONS

Non-Final Office Action dated Apr. 5, 2022 issued in related U.S. Appl. No. 16/678,512, 11 pages.

\* cited by examiner

WIRE SPOOL GUN

CROSS-REFERENCE

This application claims priority to U.S. Provisional application No. 62/887,014 filed Aug. 15, 2019 and titled "Wire Spool Gun," the entire disclosure of which is incorporated herein by reference for all purposes.

BACKGROUND

"Spool gun" is a common name referring to a GMAW or MIG welding torch (or gun), connected to a power supply or welding machine via electric cabling. Spool guns utilize an independently contained wire spool and wire feed mechanism, usually driven via electric motor. These torches are hand-held units, usually comprised of a plastic housing, a vertical grip portion that houses the electric motor, a mechanical wire feed system, a wire spool housing containing a spool of welding wire, a trigger that controls the on/off function of the torch, a torch neck through which the welding wire is fed onto the work piece, and sometimes a control knob or button(s) that allows the user to control the output speed of the welding wire through the torch. Spool guns, such as this, are commonly used in aluminum welding applications, but can be used for a variety of wire types such as mild and stainless steel.

SUMMARY

This disclosure is directed to a spool gun having numerous individual features never seen before in wire spool guns. Alone, and much more when combined, the features provide a greatly improved spool gun.

The spool gun of this disclosure has a very unique look, provided by external features, but also has unique internal features. The spool gun has its wire spool compartment located below the handle and the user's hand, when the user is gripping the spool gun in an operational position. The spool compartment housing cover can be secured on to the axle securing the spool without a bolt or screw, avoiding threading into or onto the axle. The spool gun has the drive motor located in front of the user's hand, when the user is gripping the spool gun in an operational position; thus, the drive motor is not located in the handle or grip of the spool gun. Having the drive motor so located allows the power/gas cable to be moved farther forward toward the tip of the spool gun, a more user-friendly location for the cable.

Having the motor and the power/gas cable moved toward the tip of the spool gun and the spool housing below the handle of the spool gun modifies the balance point of the gun and the center of gravity, resulting in less strain on the user's wrist during extended use of the spool gun.

One particular implementation described herein is a spool gun having a distal end configured to be positioned away from the user when the spool gun is in use and a proximal end configured to be positioned proximate the user when the spool gun is in use. The spool gun has a body portion enclosing a wire feed subsystem, a handle portion having a first end connected proximal to the body portion and extending to the proximal end of the spool gun, a welding torch manifold proximal to the body portion, and a gas/power cable inlet connected to the manifold and positioned between the handle portion and the welding torch manifold.

In some implementations, the wire feed subsystem is proximal to the gas/power cable inlet, e.g., between the gas/power cable inlet and the handle portion. In some implementations, the gas/power cable inlet is positioned between the wire feed subsystem and the welding torch manifold.

In some implementations, the spool gun also has a spool housing at a second end of the handle opposite the first end, the spool housing having an interior and a removable cover providing access to the interior.

In some implementations, the spool gun has a wire feed trigger proximate the handle portion, operably connected to the wire feed subsystem, the trigger positioned between the handle portion and the gas/power cable inlet.

Another particular implementation described herein is a spool gun having a distal end configured to be positioned away from the user when the spool gun is in use and a proximal end configured to be positioned proximate the user when the spool gun is in use. The spool gun has a body portion enclosing a wire feed subsystem, a handle portion having a first end connected proximal to the body portion and extending to a wire spool housing at the proximal end of the spool gun, an armature connecting the spool housing to the body portion, a welding torch manifold proximal to the body portion, and a gas/power cable inlet connected to the manifold.

In some implementations, the wire feed subsystem is proximal to the gas/power cable inlet and/or between the gas/power cable inlet and the handle portion. In some implementations, the gas/power cable inlet is positioned between the handle portion and the welding torch manifold.

Yet another particular implementation described herein is a spool gun having a distal end configured to be positioned away from the user when the spool gun is in use and a proximal end configured to be positioned proximate the user when the spool gun is in use. The spool gun has a body portion enclosing a wire feed subsystem, a handle portion having a first end connected proximal to the body portion and extending to a wire spool housing at the proximal end of the spool gun, a wire feed trigger proximate the handle portion operably connected to the wire feed subsystem and the wire spool housing, an armature connecting the spool housing to the body portion, a welding torch manifold proximal to the body portion, and a gas/power cable connected to the manifold. When the spool gun is in use, the spool gun has a center of gravity located no more than three inches proximal to the wire feed trigger, thus providing a balanced unit for the user.

In some implementations, the center of gravity is no more than two inches proximal to the wire feed trigger. Additionally or optionally, the center of gravity is within the handle portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

Figure 1:
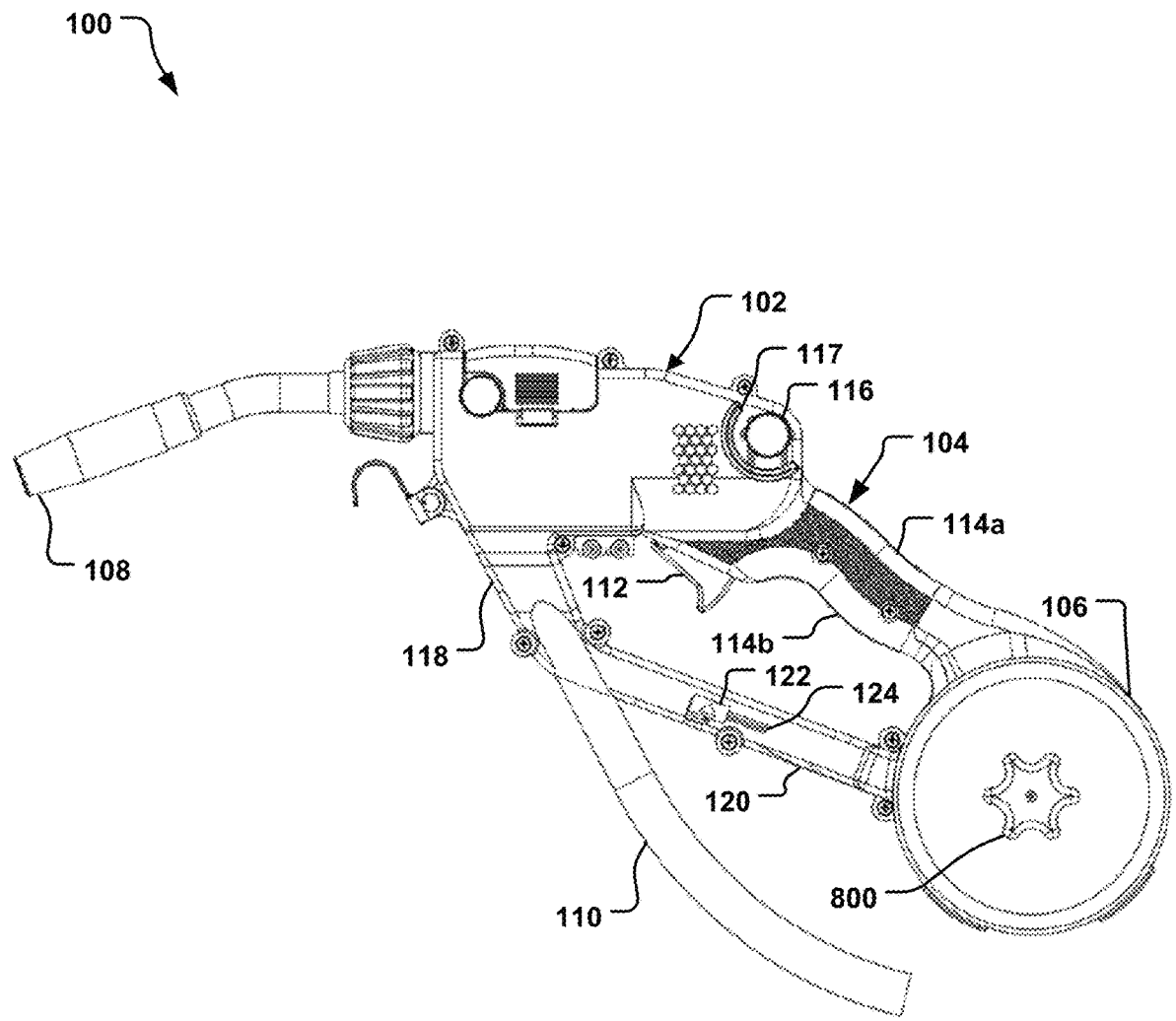
FIG. 1 is a side view of an example wire spool gun according to this disclosure.

"Spool gun" is a common name referring to a GMAW (gas metal arc welding), MIG (metal inert gas) or MAG (metal active gas) welding torch or gun that is connected to a power supply or welding machine via electric cabling. Spool guns utilize an independently contained wire spool and wire feed mechanism, usually driven via electric motor. These guns or torches are hand-held units, usually including a housing (e.g., plastic housing), a vertical grip portion that houses the electric motor, a mechanical wire feed system, a wire spool housing configured to receive and retain a spool of welding wire, a trigger that controls the on/off function of the torch, a torch neck through which the welding wire is fed onto the work piece, and sometimes, controls such as knob(s) or button(s) that allow the user to control the output speed of the welding wire through the torch. Through the utilization of a self-contained wire feed system and wire spool, the drag force on the length of wire being fed into the weld is significantly reduced. For this reason, spool guns are commonly used in aluminum welding applications, but can be used for a variety of wire types including mild and stainless steel.

The spool gun of this disclosure focuses on improving or addressing several common wire spool gun issues:
1) improved ergonomics and balance;
2) easy adjustment of wire feed speed while welding;
3) reducing spool change time;
4) improved spool brake with spool life indicator; and
5) integrated contact tip storage.

The spool gun of this disclosure has improved ergonomics, designed to fit well in the hand of the user within the natural curvature of the palm and the natural curvature beneath the wrist. The spool gun has an ambidextrous non-vertical angled grip that may exhibit a curved or rounded ergonomic profile. The grip portion of the spool gun described and shown herein is not simply a vertical housing for the electric motor but is designed to be comfortable for the user; unlike in conventional spool guns, the motor is not housed within the grip portion. This allows the grip to take on less of a cylindrical profile than those of traditional spool guns thus improving overall ergonomics. The grip is designed (e.g., dimensioned) taking into account a user's hand rather than the dimensions and/or shape of the motor. Because of this, the spool gun of this disclosure does not need to use an axial direct drive train to power the wire feed system, using instead a 90-degree drive system allowing the gear box to be much simpler, more robust, and more compact than those of traditional spool guns. This also allows for the elimination of gear backlash during operation.

Balance is a key ergonomic characteristic of the spool gun of this disclosure. Unlike traditional spool guns, the spool gun of this disclosure places the mass of the drive system (motor, gearbox, etc.), the power and gas input manifold, torch neck, and hanging mass of the power and gas supply cable in front of the wrist of the user. Any mechanical couple or bending stress on the wrist due to this forward mass is counterbalanced and canceled out by the mass of the wire spool that is housed in the spool housing to the rear of the hand of the user beneath the wrist. Having the mass of the wire spool beneath the wrist, rather than above the user's hand as is typical, distributes and balances the mechanical load from the wrist of the user evenly about all three principle axes. For example, while flat welding, this combination of spool location and motor location places the center of gravity of the spool gun anywhere between the user's first (pointer) and third (ring) fingers along the grip portion of the handle. For out-of-position welding (e.g., overhead vertical welding), the force on the spool gun due to gravity is vectored axially through the wrist and down the arm of the user to the elbow inducing very little to no bending stress.

In some implementations, this center of gravity or balance point is within or close to the handle gripped by the user. The center of gravity or balance point is no more than three inches proximal (behind) the wire feed trigger, in some implementations no more than two inches proximal the trigger.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 2:
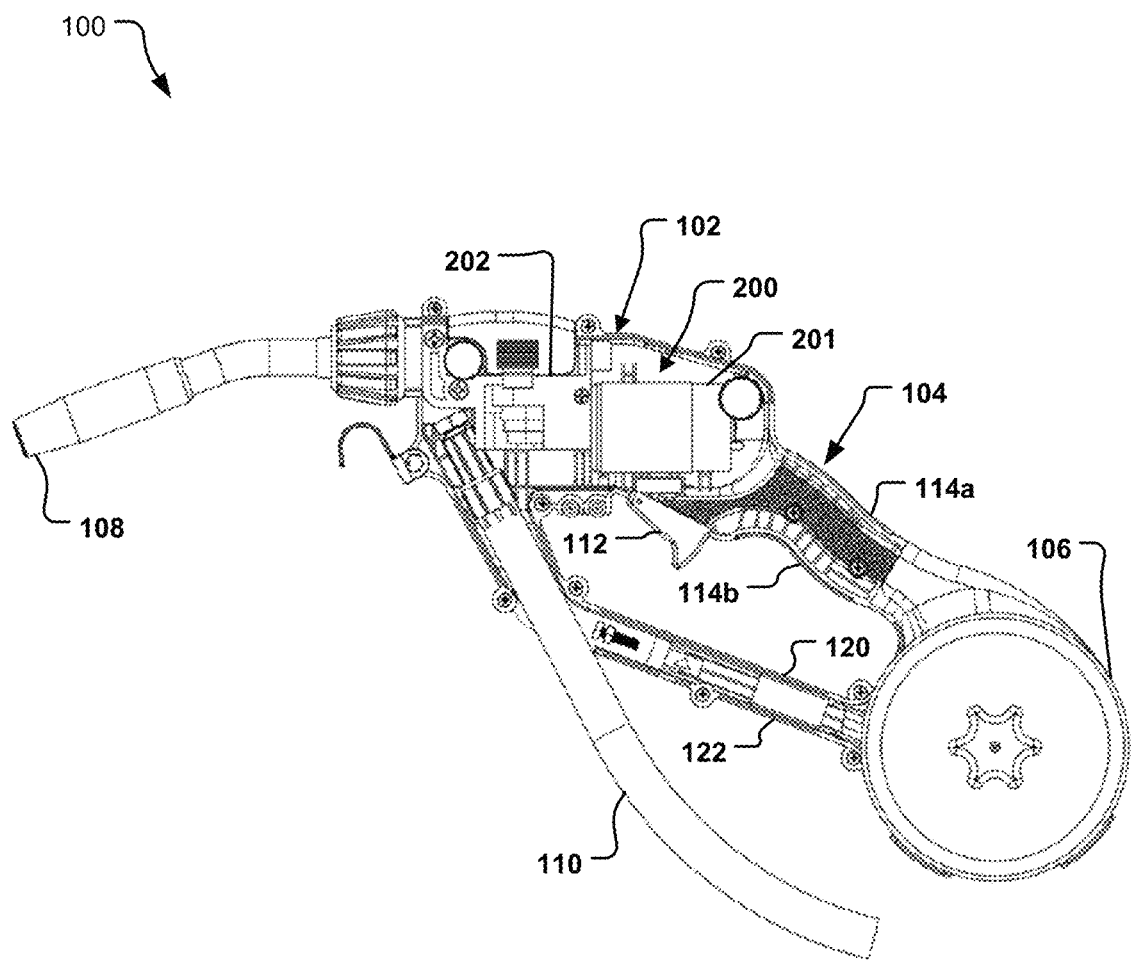
FIG. 2 is an internal side view of the example wire spool gun of FIG. 1.
Figure 3:
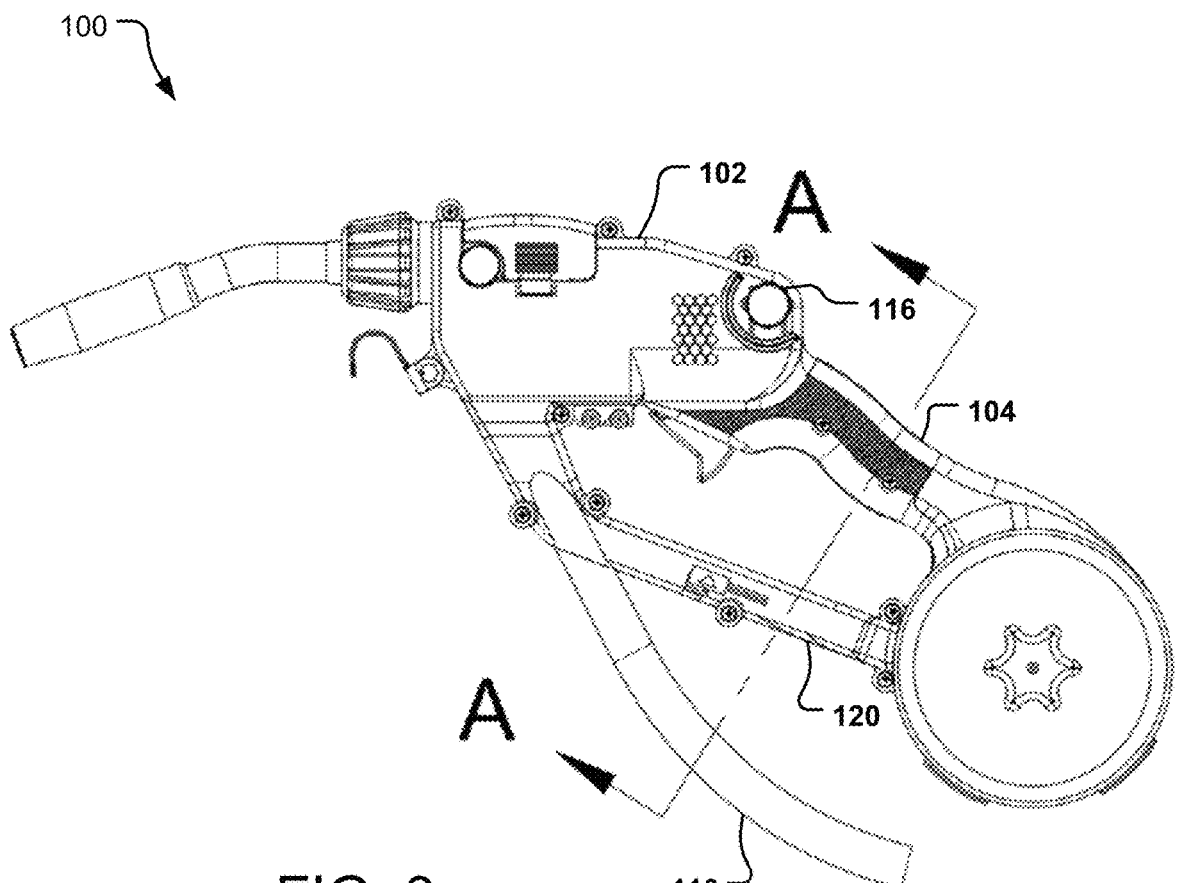
FIG. 3 is another side view of the example wire spool gun of FIG. 1.

The drawings illustrate a spool gun according to this disclosure and numerous features of the spool gun that could be utilized in other spool guns. FIGS. 1, 2 and 3 provide a look at the overall wire spool gun, whereas the remaining figures are directed to certain features of the spool gun. The spool gun and spool gun features described herein, as well as variations thereof, provides numerous advances and benefits over traditional or other spool guns.

Turning to FIG. 1, a spool gun 100 is shown. The spool gun 100 has a body portion 102 having connected thereto a handle portion 104 to be gripped by a user's hand during use of the spool gun 100 and a wire spool housing 106 at the proximal end of the handle portion 104 opposite the body portion 102; in some implementations, the body portion 102 and the handle portion 104 may be a single piece, e.g., having no discernable break therebetween. At the proximal end of the handle portion 104 is a wire spool housing 106. From the distal end of the body portion 102 extends a welding tip 108. The body portion 102, the handle portion 104, the wire spool housing 106 and the welding tip 108 provide an overall look to the spool gun 100 that is unique to the spool gun 100. In the particular implementation shown, the spool gun 100 has, in order, from the distal end to the proximal end, the welding tip 108, the body portion 102, the handle portion 104, and the wire spool housing 106.

The spool gun 100 includes an input gas and power cable 110 (herein after referred to as a gas/power cable or the like) that provides gas (e.g., argon, oxygen) and power (e.g., electricity) to the gun 100, the gas/power cable 110 entering the body portion 102 at or proximate the distal end of the body portion 102; the cable 110 does not run through the handle portion 104, nor does any other input gas line or input power line. As is evident from FIG. 1, the spool gun 100 is configured, so that when in use, the tip 108 is most distal from the user, then the input gas/power cable 110, then the majority of the body portion 102 and the handle portion 104, with the spool housing 106 proximal and most proximate to the user. When in use, the spool housing 106 is positioned between the user's hand (which would be on the handle portion 104) and the user's body. Such an arrangement of features provides an ergonomic, balanced spool gun.

A trigger 112 is positioned on the body portion 102, readily reachable by a user (e.g., with their pointer finger) having their hand on the handle portion 104, with the palm of the hand proximate the top grip region 114a of the handle portion 104 and the fingers wrapped around the bottom grip region 114b of the handle portion 104. Either or both of the grip regions 114a, 114b may be ergonomically designed, with a contour to accept a user's hand, palm, and fingers. Also readily reachable by the user (e.g., with their thumb) is a wire feed adjustment device 116 located towards the top of the body portion 102. The adjustment device 116 is positioned behind, or closer to the user when the spool gun 100 is in use, than the trigger 112.

Proximate the distal side of the body portion 102 is a secondary hand grip region 118 on the lower side of the body portion 102 near the connection of the input gas/power cable 110 where a user can position their other (non-trigger) hand, e.g., during welding, to stabilize the spool gun 100. Unlike in traditional spool guns, the secondary hand grip region 118 of the spool gun 100 is at a slightly higher angle in front of the main handle portion 104 and the trigger hand of the user. This secondary hand grip 118 forms an acute angle in relation to the main handle portion 104; for example, the angle from the surface of the secondary hand grip region 118 to the top grip region 114a is about 25 to 60 degrees (e.g., about 30 to 45 degrees), and/or the angle from the surface of the secondary hand grip region 118 to the bottom grip region 114b is about 15 to 45 degrees (e.g., about 30 to 35 degrees, e.g., about 30 degrees). When flat welding, this secondary grip portion 118 can be held in or by the other hand of the user. Utilizing the natural motion of the wrist of the user's other hand, this hand can then act as a pivot location on which the body portion 102 of the spool gun 100 can be swept through an angle of nearly 180-degrees. This allows for longer un-interrupted welds that are smooth and professional in appearance.

Extending between the body portion 102, from a region near the connection of the gas/power cable 110 to the body portion 102, and the wire spool housing 106 is an armature 120. The armature 120 stabilizes the wire spool housing 106 in relation to the body portion 102 and, depending on the particular design, helps with the balance of the spool gun 100. Present within the armature 120 is a spool brake 122 operably connected to the internal volume of the wire spool housing 106.

Figure 3A:
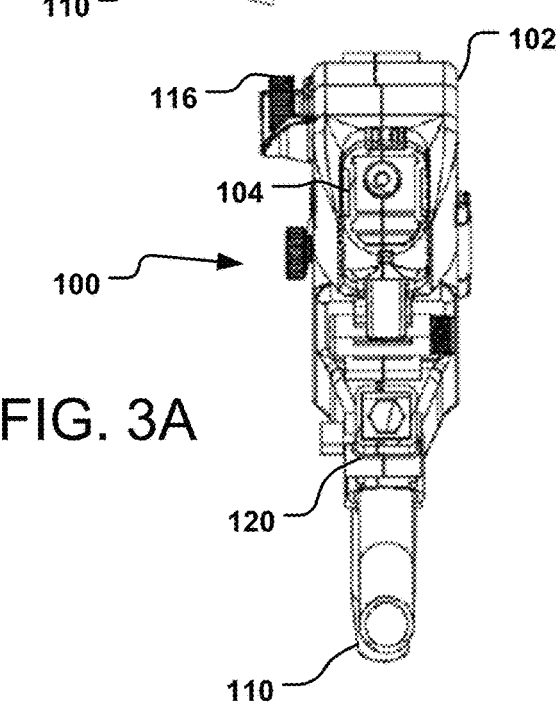
FIG. 3A is a cross-sectional view taken along line A-A of FIG. 3.

Inside the body portion 102, seen in FIG. 2, the spool gun 100 has a wire feed subsystem 200 that includes a motor 201 and a wire feed mechanism 202, which feeds wire from the wire spool housing 106, through the handle portion 104 and the body portion 102 and out the tip 108. Also in FIG. 2, additional details regarding the spool brake 122 are seen. FIG. 3 is similar to FIG. 1 with FIG. 3A showing certain internal features.

The following discussion refers to the wire spool gun 100 of FIGS. 1, 2 and 3 and to specific features shown in any or all of FIGS. 1, 2 and 3 and/or FIGS. 4 through 15.

Figure 4:
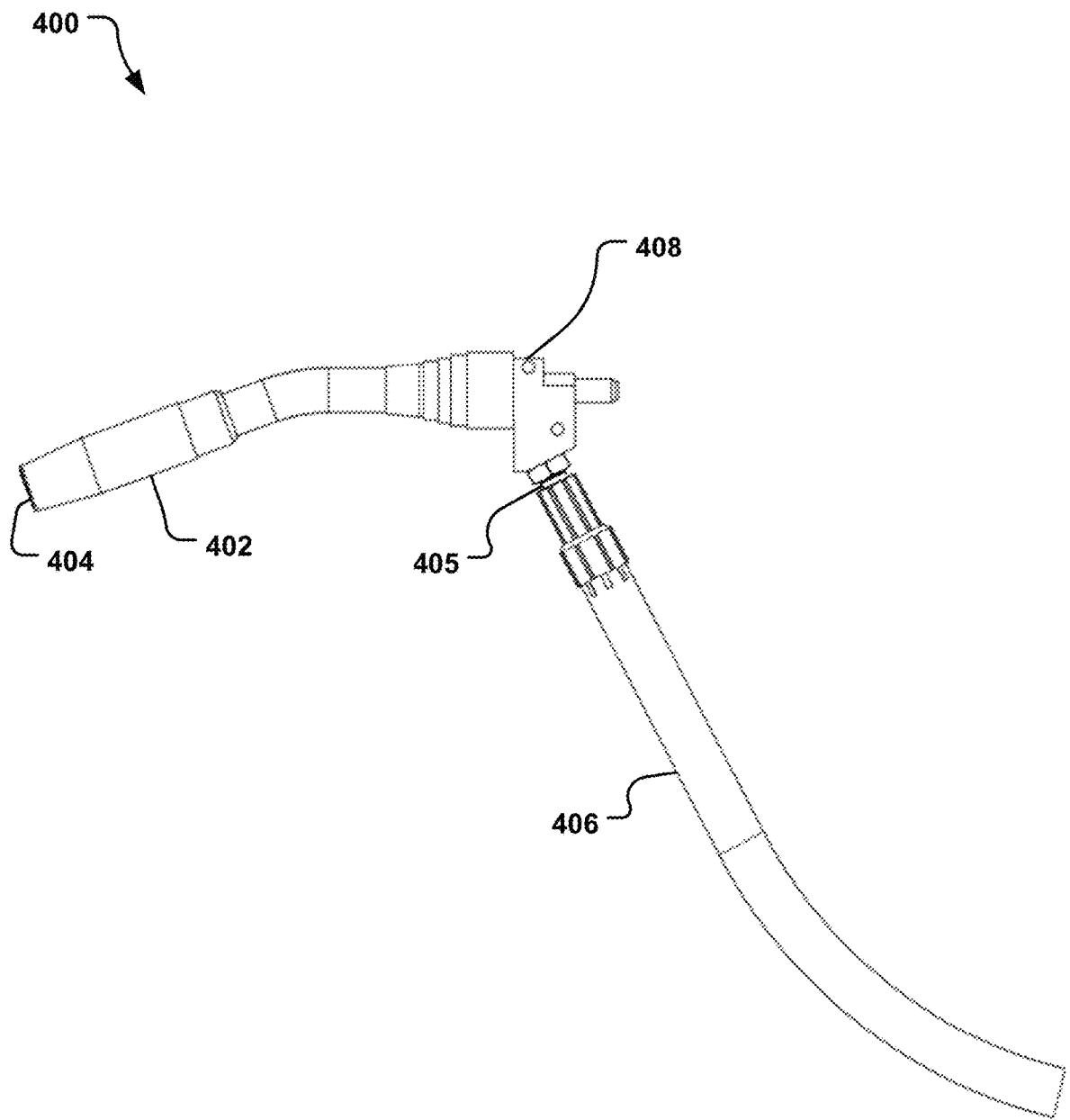
FIG. 4 is a side view of a torch assembly having an input gas manifold for the wire spool gun of FIG. 1.

Turning to FIG. 4, FIG. 4 shows a welding torch assembly 400, which includes a torch neck 402 that terminates at a welding tip 404 (similar to the tip 108 of FIG. 1), and a power and gas supply cable 406 that engages the torch neck 402 at a cable inlet 405 to a connection manifold 408. The welding tip 404 is connected to the manifold 408.

Because the spool gun 100 uses the connection manifold 408 connected directly to the torch neck 402, the power and gas supply cable 406 attaches to the manifold 408 via the inlet 405 at the distal end of the body 102. The power and gas supply cable 406 thus drapes out of the bottom of the body portion 102 of the spool gun 100, in front of the handle portion 104 and the trigger hand of the user. Unlike traditional spool guns, this power/gas cable 110, 406 does not connect to the spool gun (e.g., to the body portion 102) above the user's wrist, and therefore does not need to be draped over the shoulder of the user during use, as is common with traditional spool guns. This removes strain from the user's wrist and shoulders during long periods of operation allowing the user more freedom of motion and welding technique.

As thicker gauge welding input power and gas cables are used for the cable 110, 406, more of the mass of the overall spool gun 100 may be distributed forward of the wrist. For simple balance tuning of the spool gun 100, the cable 100, 406 within the first several inches as it drapes out of the bottom of the spool gun body portion 102 can be fastened (e.g., taped, zip-tied) to the spool gun 100, e.g., to the armature 120, e.g., in the geometric cusp exhibited by the intersection of the armature 120 and wire spool housing 106.

As indicated above, the spool gun 100 also has an easy adjustment of wire feed speed while welding, adjustable by the wire feed adjustment device 116 seen in FIGS. 1, 2 and 3.

Because GMAW welding is a constant voltage process, weld characteristics are changed via adjustments to the current of the output power and/or adjustments to the speed of the wire as it is fed out of the spool gun. Minute adjustments to either of these two parameters (current and wire speed) can dramatically affect weld performance and characteristics. It is common for users to set a specific output current on their power supply or welding machine and then experiment with several small wire feed speed adjustments.

Traditionally, spool guns equipped with wire feed speed adjustment capabilities place the adjustment interface (e.g., control knob or button(s)) far away from the trigger hand of the user. To utilize these knobs or buttons, the user typically must stop welding, locate the control interface, make an educated guess as to the magnitude of the needed adjustment, reposition their body, and resume welding. Alternately, the user must use their other hand to make the adjustment(s). This process may be repeated multiple times until the user is satisfied with the machine settings.

The spool gun 100 includes the wire feed adjustment device 116 for wire feed speed adjustment and control. The wire feed adjustment device 116 may adjust the wire feed speed incrementally (stepwise) or continuously. This device 116 is placed in close proximity to the trigger hand grip region 114 and is easily accessible with the thumb of the user's trigger hand while welding. In the figures, the device 116 is located on the left side of the body portion 102, so that a right-handed user can readily reach the device 116 with their right thumb; in another design, the device 116 can be on the right side of the body portion 102 so that a left-handed user can readily reach the device 116 with their left thumb.

In one implementation, the device 116 is a knob, and turning upward (counterclockwise, away from the user) on the knob 116 increases the wire feed speed, and turning downward (clockwise, toward the user) reduces the wire feed speed. In an opposite and alternate implementation, upward decreases the wire feed speed and downward increases the wire feed speed. The device 116, especially when a knob, may have a continuous motion or may have an incremental motion (clicks, or steps).

The device 116 allows the user to easily adjust the wire feed speed and more precisely dial in machine settings for optimum performance while welding. In alternate designs, rather than a knob, the adjustment mechanism may be a lever (e.g., a ratcheting lever). The device 116, whether a knob, a lever, or other mechanism, can have a surface texture to improve contact or engagement with the device 116.

The wire feed speed adjustment device 116 may have a guard 117 (FIG. 1) at least partially around the device 116. This guard 117 protects the set position of the device 116, e.g., when the spool gun is set down or stored. This allows the user to use the same wire feed speed setting through multiple uses of the spool gun 100.

The spool gun 100 also provides a reduced spool change time compared to other spool guns, due to a non-threaded, quick-release or, e.g., quarter-turn cover engagement.

As indicated above, the spool of welding wire is housed behind and below the handle portion 104 in the wire spool housing 106. During use, as the wire is being fed, the cylindrical spool of wire rotates about its central axis on an axle as wire is pulled through the mechanical wire drive or feed mechanism 202 (FIG. 2) of the spool gun 100. In traditional spool guns, this axle is usually solid metal and is affixed at one end to the spool housing. On the opposite end of the axle, a threaded bore accepts a bolt or thumb screw that holds the welding wire spool compartment cover in place. When changing the spool of welding wire, the bolt or thumb screw is removed, the cover is lifted away, and the spool of welding wire can be accessed. The metal axle supports the weight of the spool and provides threads for engaging the bolt or screw.

Conversely, the spool gun 100 of this disclosure can use any metal, polymer or composite material as the axle, e.g., due to non-threaded engagement of both the welding wire spool and the welding wire spool housing cover of the spool housing body.

Figure 5:
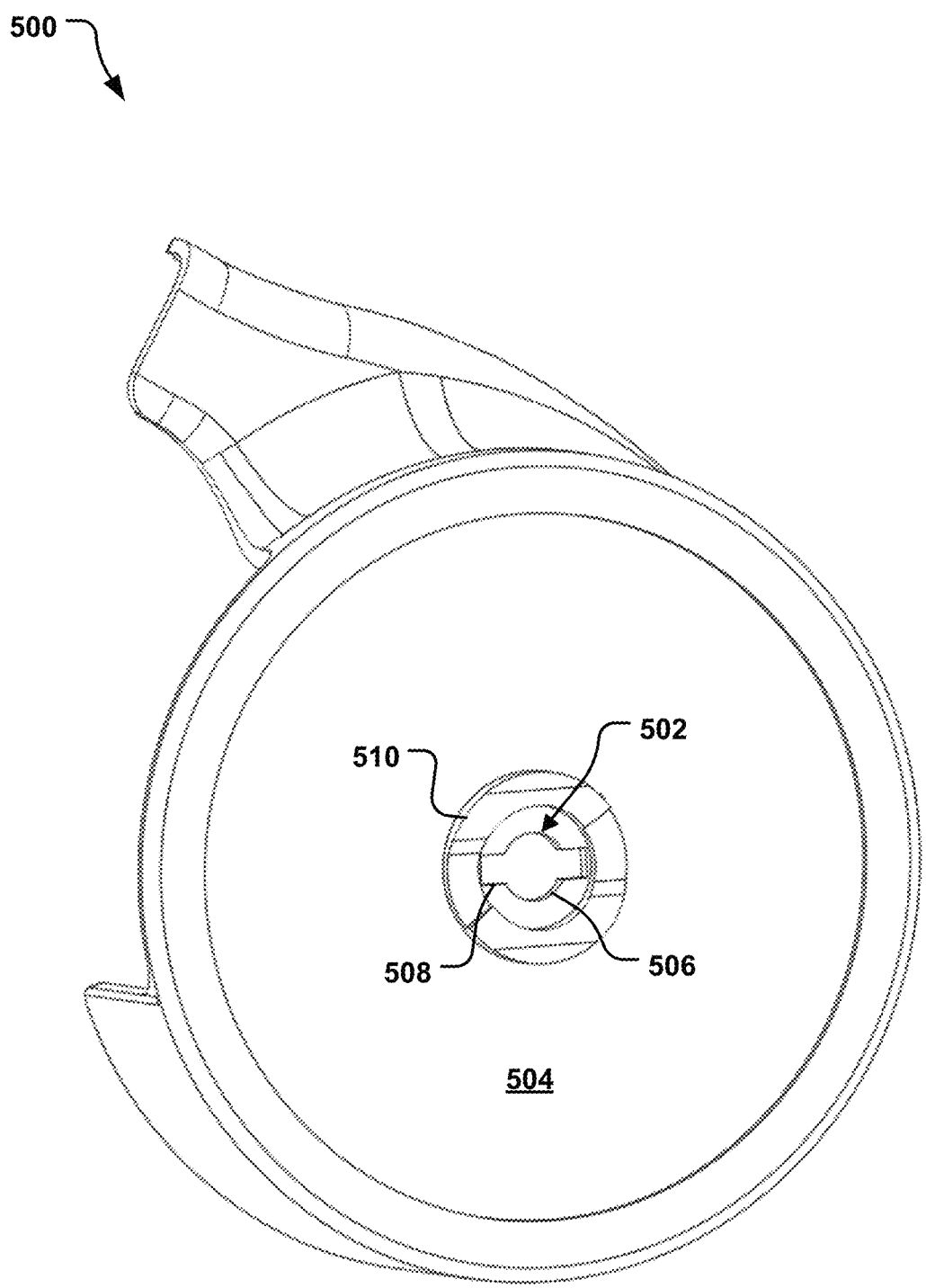
FIG. 5 is a perspective view of a wire housing cover engageable with a housing body to form a wire housing of the spool gun of FIG. 1.
Figure 6:
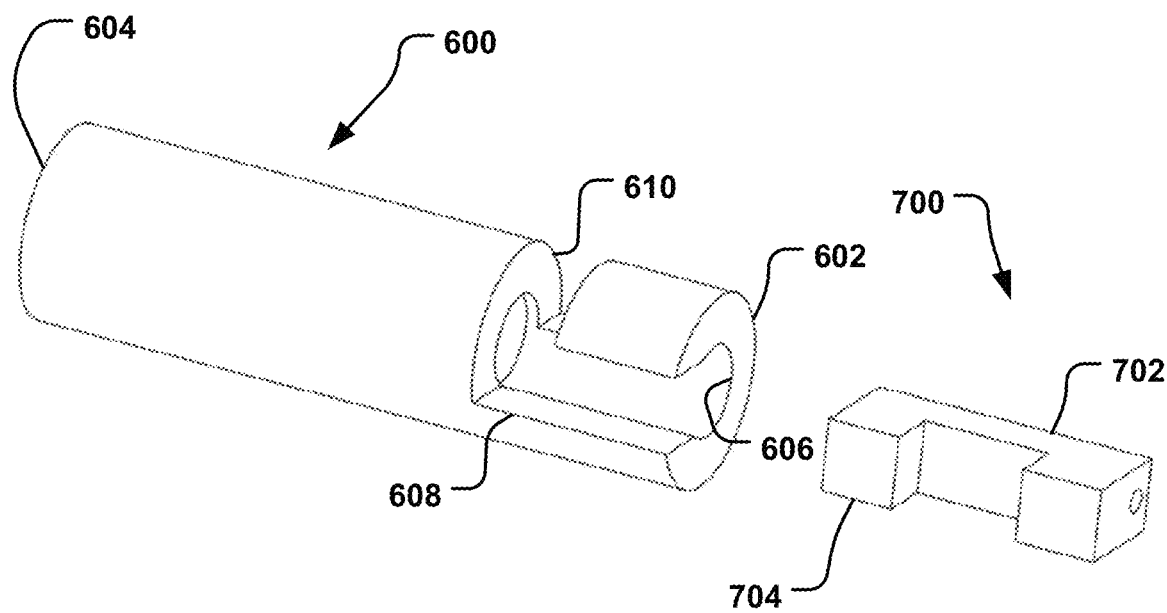
FIG. 6 is a perspective view of an axle for retaining the wire spool in a wire housing of the spool gun of FIG. 1 and a secondary member for retaining the wire spool in the wire housing.
Figure 7:
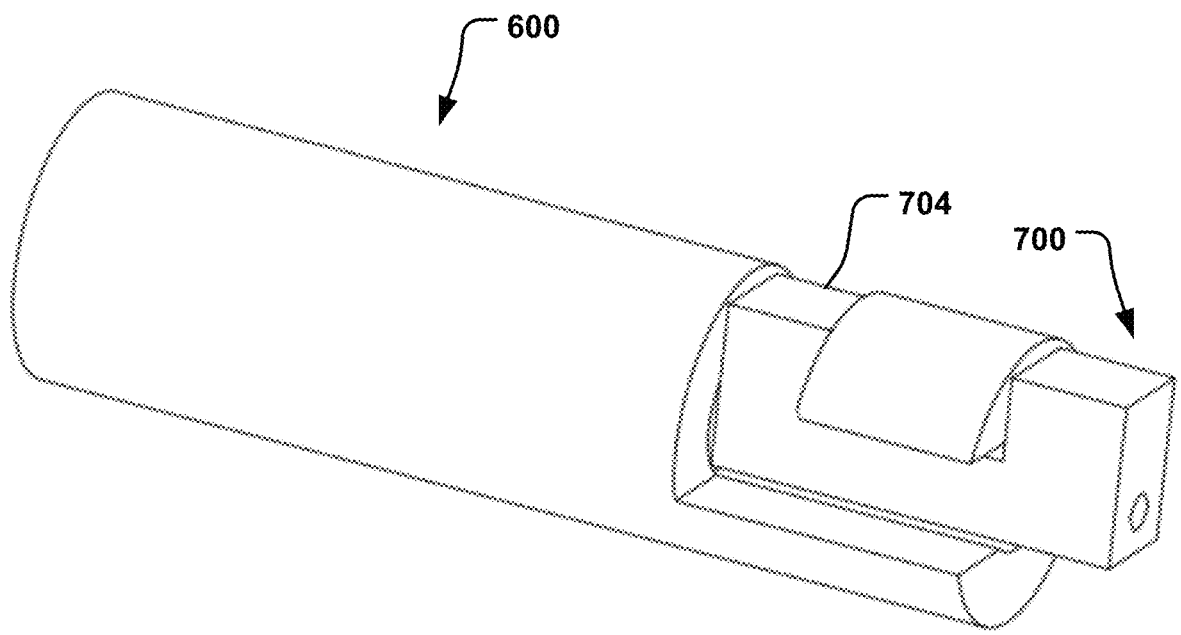
FIG. 7 is a perspective view of the axle of FIG. 6 joined with the secondary member of FIG. 6.

FIG. 5 shows a wire spool housing compartment cover 500 (engageable with a spool housing body to form the wire spool housing 106) and FIG. 6 shows an axle 600 for use with the cover 500.

The axle 600 has an overall cylindrical shape with a first end 602 and a second end 604 and is slightly greater in length than the width of the wire spool (e.g., a standard 100 mm welding wire spool). This axle 600 is mounted on the spool gun at the bottom of the handle portion 104 below the grip regions 114 in the region of the wire spool housing 106; the mounting may be permanent (e.g., integral with the housing body or handle portion 104, e.g., done during the injection molding process of a polymer spool gun housing body) or removable (e.g., mounted with a bolt or other fastener or with adhesive, by welding, etc. to the housing body at the second end 604).

At the first end 602, the axle 600 has a centered bore 606 into which a secondary member 700 can be inserted, such as a key. Along a length of the bore 606, a keyway 608 of specific width is present. The specific width is selected to accept the secondary member 700 therein, as explained below. At or near the terminal depth of the bore 606, the keyway 608 exhibits a turn of at least 90-degrees and, retaining its specific width, is swept circumferentially about the axle 600 through an angle of 10-180 degrees; this feature is shown as 610 in FIG. 6. The internal faces created by the presence of the keyway 608 and the feature 610 may or may not be orthogonal to the internal bore 606 of the axle 600.

The secondary member 700 is used in conjunction with the axle 600 to retain the welding wire spool and the welding wire spool compartment cover 500 in correct position. The secondary member 700 has external geometry such that it can be inserted into the bore 606 and keyway 608 of the axle 600 with no interference and with minimal clearance.

The secondary member 700 has a base extension 702 with at least one protrusion 704 at or near the end of the base extension 702. The base 702 and the protrusion 704 have geometry such that the secondary member 700 can translate along the keyway 608 as the secondary member 700 is inserted into the bore 606 of the axle 600 at the first end 602. Once the secondary member 700 reaches a specific depth within the bore 606 (e.g., the end of the bore 606), the secondary member 700 can be rotated (in the illustrated implementation, rotated clockwise) through an angle of at 10-180 degrees (e.g., at least 10 degrees, e.g., no more than 180 degrees, e.g., about 90 degrees), causing the protrusion 704 to enter the portion of the keyway that is cut orthogonally to this long axis (feature 610) and seat within the keyway 608. Once these conditions are met, the protrusion 704 prevents the secondary member 700 from being removed from the axle 600 without deliberate rotation of the secondary member 700.

In some implementations, the secondary member 700 is inserted to a depth so that the protrusion 704 contacts a face at or proximate the terminal end of the keyway 608, the face which may be orthogonal to the central long axis of the axle 600. Once this contact is established, the secondary member 700 can be rotated as described so that the protrusion 704 locks into the feature 610.

Figure 8:
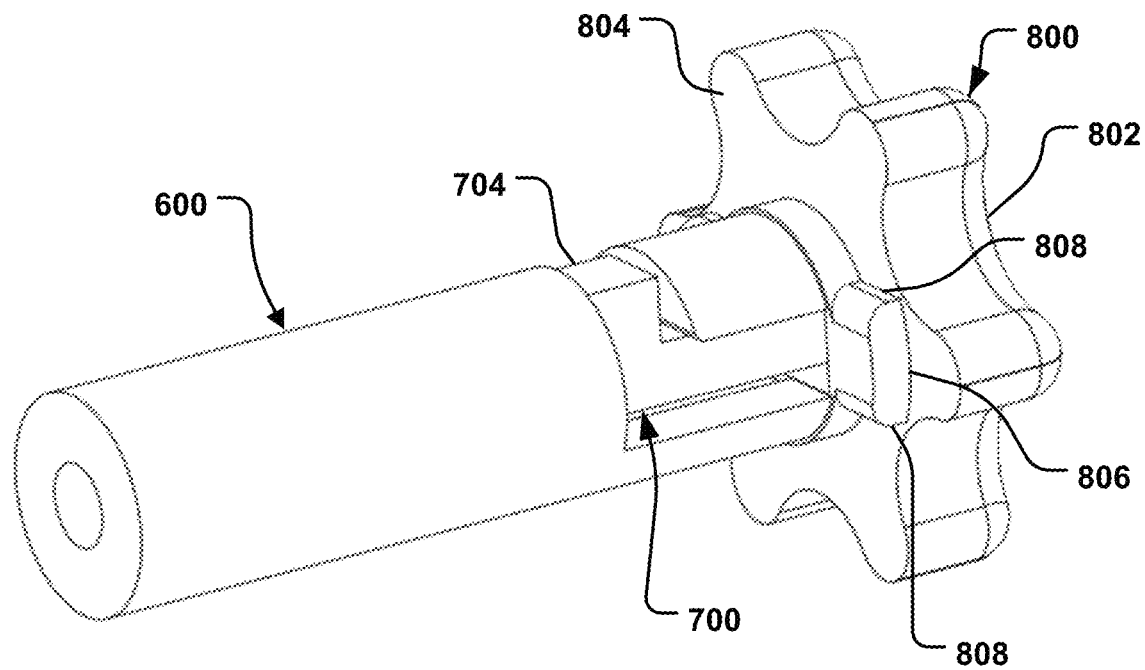
FIG. 8 is a perspective view of a handle for use with the secondary member of FIG. 6.

As seen in FIG. 8, a handle 800 can be connected to the secondary member 700 at the end opposite the protrusion 704 seated in the keyway 608 to facilitate insertion and rotation of the secondary member 700 in the keyway 608 and locking feature 610. In the illustrated implementation, the handle 800 connects to a second protrusion (best seen in FIGS. 6 and 7) at the opposite end of the secondary member 700 from the protrusion 704. The handle 800 should be of sufficient size to be manipulated by a user, e.g., wearing protective gloves. The handle 800 may be permanently attached to the secondary member 700 or may be removable and replaceable thereon or thereto.

The handle 800 has a body 802 with a back face 804 that is adjacent to the axle 600 and the secondary member 700 and that is adjacent to the front, outside face of the wire spool compartment cover 500 when installed. The back face 804 includes raised mounds or detents 806 with rounded or beveled edges 808 that can act as the main contact interface of the handle 800 to the spool compartment cover 500, when the handle 800 is pressed against the wire spool compartment cover 500. The handle 800 is shown installed on the wire spool housing 106 in FIG. 1.

Returning to FIG. 5 and the wire spool compartment cover 500, the cover 500 has a center hole or aperture 502 in a generally planar front face 504, the hole 502 of specific dimensions such that the protrusion 704 of the secondary member 700 can only pass through in certain arrangements. The hole 502, in this implementation, has a circular center 506 and two oppositely positioned extension 508. The secondary member 700 can pass through the hole 500 when the protrusion 704 is aligned with one of the extensions 508.

Around the hole 502 is a circumferential ramp or cam 510, use of which is described below. This ramp-like geometry for the ramp 510 is typically molded into the cover 500 although in some implementations may be subsequently added to the face 504.

To install a spool of welding wire in the wire spool housing 106 (FIG. 1), the wire spool is placed on the axle 600 mounted to the spool gun 100 in the region configured to receive the spool (the region not readily seen in any of the figures). The spool housing cover 500 is placed over the spool and the axle 600, with the axle 600 aligned with the hole 502; in some implementations, the axle 600 does not extend out from the hole 502. The secondary member 700, in some implementations with the handle 800 attached thereto, is passed through the hole 502, with the protrusion 704 passing though the extension 508.

Once the protrusion 704 of the secondary member 700 passes through the hole 502, particularly the extension 508, the detents 806 on the back of the handle 800 contact the ramp 510. As the handle 800 is rotated (e.g., clockwise), the detents 806 ride on the ramp 510, applying pressure on and against the cover 500 and pushing it in.

In an alternate method, the handle 800 is not present on the secondary member 700 prior to inserting the secondary member 700 through the hole 502, but rather, the handle 800 is mounted on (e.g., screwed into or onto) the secondary member 700 after passing at least a portion of the secondary member 700 through the hole 502, thus rendering the secondary member 700 and optionally the handle 800 inseparable from the wire spool compartment cover.

The spool axle 600 is of specific length and/or diameter such that it does not contact the inside of the wire spool compartment cover 500 when the cover 500 is installed on the housing 106. In some implementations, the axle 600 preferably provides no support or reaction force when an external force is applied to the face 504 of the cover 500, e.g., by the detent 806 engaging the ramp 510; rather, all support for the cover 500 is at the peripheral edges of the cover 500.

Utilizing linear elastic displacement and strain energy due to mechanical bending, when the handle 800 on the secondary member 700 is rotated about the long axis of the axle 600, the detents 506 on the back of the handle 800 interact with the ramp-like geometry 510 on the face 504 of the wire spool compartment cover 500. This interaction displaces the face 504 of the wire spool compartment cover 500 inward toward the welding wire spool by the height of the geometry of the ramp 510, thus developing spring force, e.g., due to mechanical bending. This spring force is of sufficient magnitude to hold all of the friction faces of the components (e.g., detent 806, ramp 510) in place.

Operably connected to the welding wire spool housing 106 is a hollow inlet guide 900 (FIG. 9A) for receiving wire from the wire spool retained within the housing 106. The guide 900 has an internal passage 902 with an inlet 904 and an outlet 906, and a tapered region 908 proximate the inlet 904. The tapered region 908 is tapered at a high angle, from wide to narrow; in the shown implementation, opposite sides of the tapered region 908 form an angle of about 40 degrees, although in other implementations this angle may be, e.g., from 30 to 60 degrees. The tapered region 904, in this implementation, occupies approximately half of the length of the channel 902, although in other implementations may occupy more or less of the length of the channel 902, even up to the entire length of the channel 902.

The guide 900 provides a passage that guides the loose end of a new spool of welding wire into the small diameter welding liner. The channel 902 routes the welding wire to the body portion 102 of the spool gun 100, through the handle portion 104, into the wire feed mechanism 202 (FIG. 2). A large opening at the inlet 904 of guide 900, progressing to the tapered region 908 with a high angle taper, allows the user to easily manipulate very thin welding wire into the guide 900.

Figure 9A:
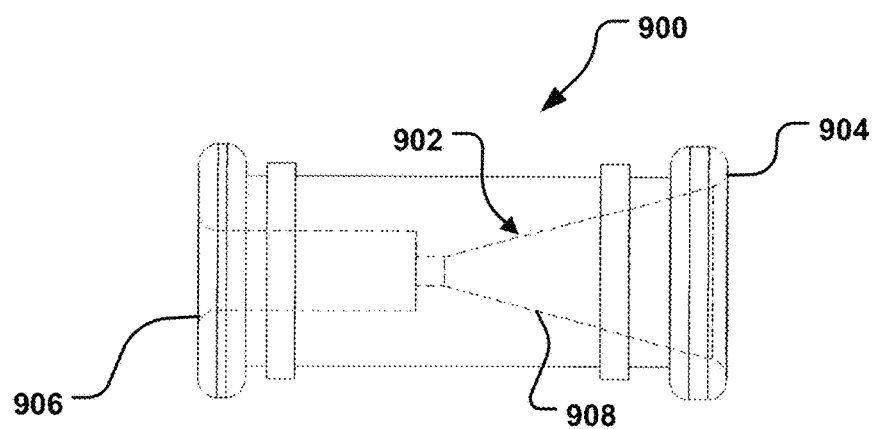
FIG. 9A is a cross-sectional side view of a wire inlet guide.
Figure 9B:
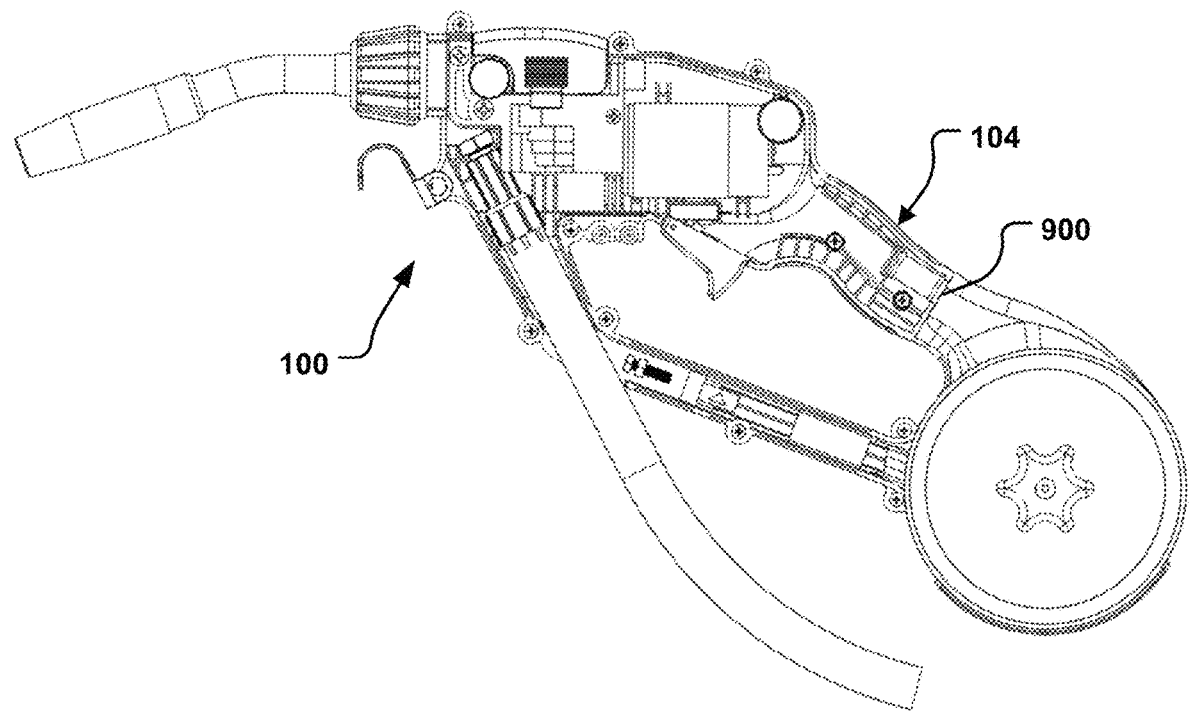
FIG. 9B is a cross-sectional side view of the spool gun of FIG. 1 showing the wire inlet guide.

The wire inlet guide 900 may be positioned at any location between the wire spool housing 106 and the wire feed mechanism 202; in one particular implementation, shown in FIG. 9B, the inlet guide 900 is located within the handle portion 104.

Returning to FIGS. 1 and 2, when the on/off trigger 112 of the spool gun 100 is activated, the cylindrical spool of welding wire (retained within the spool housing 106) rotates about its central axis on the axle 600 as wire is pulled from the wire spool housing 106, through the handle portion 104 and through the wire feed mechanism 202 of the spool gun 100.

Figure 10:
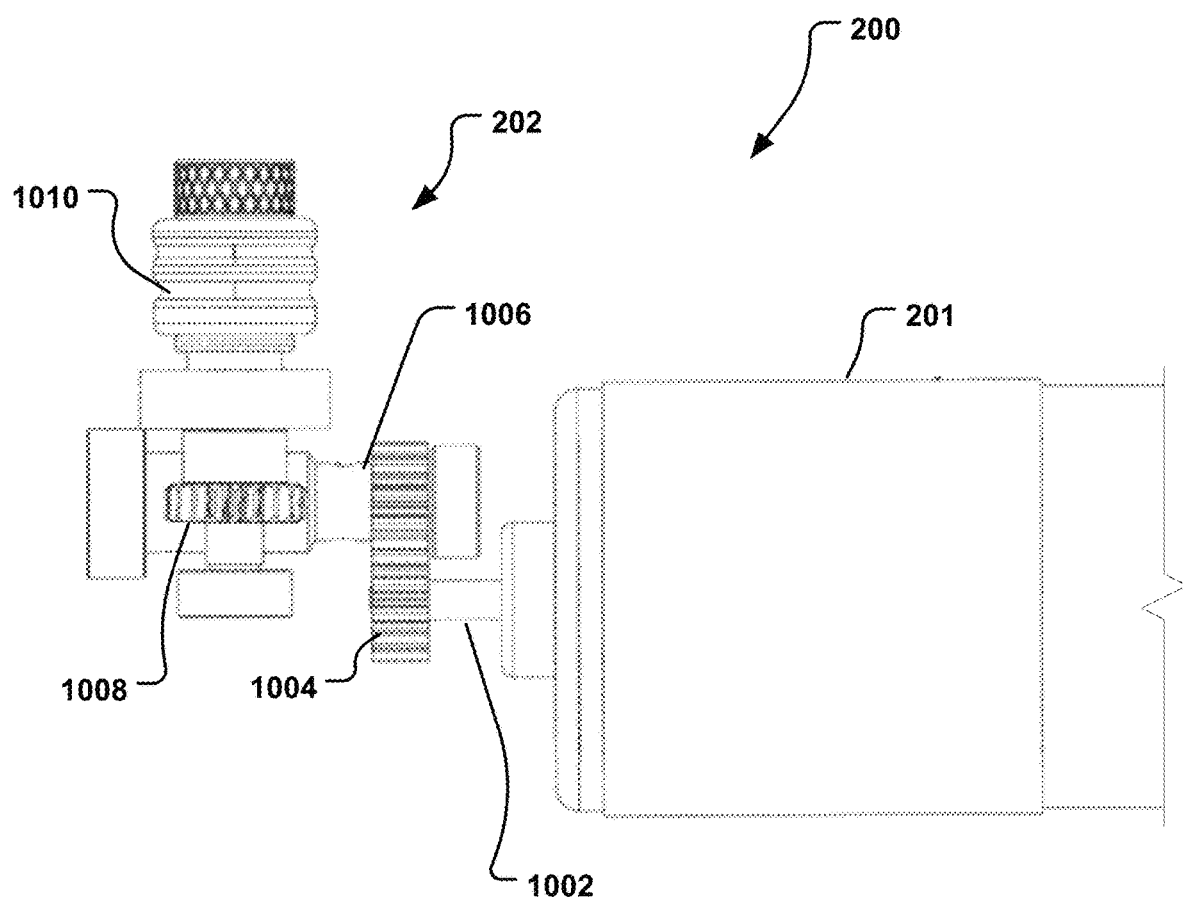
FIG. 10 is a side view of the wire feed mechanism of the spool gun of FIG. 1.

FIG. 10 illustrates an implementation of the wire feed subsystem 200 of the spool gun 100. The wire feed mechanism 202 is positioned at a 90-degree angle to the drive motor 201 and utilizes a worm gear.

The drive motor 201 has an axial shaft 1002 extending therefrom and having a first gear 1004 operably connected thereto which is operably connected to a worm gear 1006. The worm gear 1006 is meshedly engaged with a third gear 1008 that directly drives a wire feed 1010. The wire feed 1010 is configured to engage and pull the wire (retained within the spool housing 106) through the inlet guide 900 and push the wire through the torch neck 402 to the tip 404.

A spool of welding wire can develop significant angular momentum during this rotation such that, if unhindered by an external force, the welding wire spool would continue to rotate (unwind) after the on/off trigger is de-activated. When wound onto a spool, welding wire is under a significant amount of spring tension and if any slack is allowed by the user, countless wraps of wire can unfurl from the spool. This situation is quite common and is very unfortunate as it can lead to loops of wire becoming tangled, damaged, and even unusable. If a single one of the countless wraps of wire on a spool becomes tangled underneath another wrap, it is nearly impossible to correct and the entire spool may be rendered unusable. For this reason, the spool gun 100 includes the spool brake 122, in this design, located in the armature 120. The spool brake 122 applies a constant and sufficient friction force to counteract the angular momentum of a turning spool to bring the spool to an abrupt stop when the on/off trigger 112 of the spool gun 100 is de-activated.

Traditional spool brakes are difficult to use and typically require both hands of the user. One hand is used to hold the spool brake out of the way under constant spring tension while the other hand is used to install the spool and feed the free end of the wire into the wire liner (all while attempting to keep the spool of wire from unfurling and destroying itself). Conversely, the spool brake 122 is easy to use by the user. The spool brake 122 allows one hand operation and utilizes a locking mechanism that allows it to be locked back away from the welding wire spool for easy welding wire spool installation.

As seen in FIGS. 1, 2 and 10, the spool brake 122 is housed in the lower armature 120, a hollow angled member of the spool gun 100 positioned beneath the handle portion 104. The spool brake 122 extends to and into the welding wire spool housing 106 and terminates on the perimeter of the welding wire spool (particularly, on the wire wraps).

Figure 12:
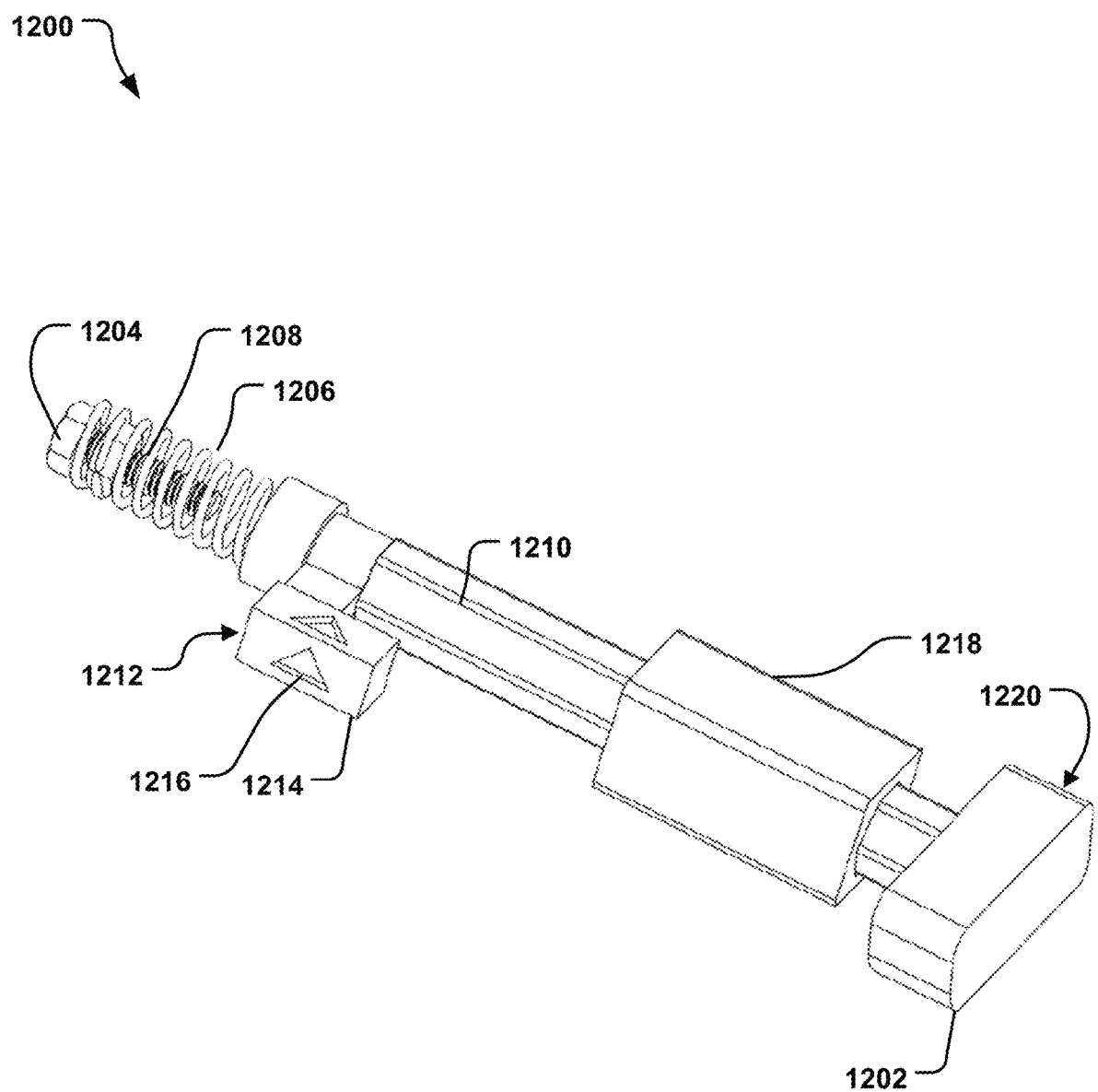
FIG. 12 is a perspective view of the wire spool brake of FIG. 11 removed from the wire spool gun.
Figure 13:
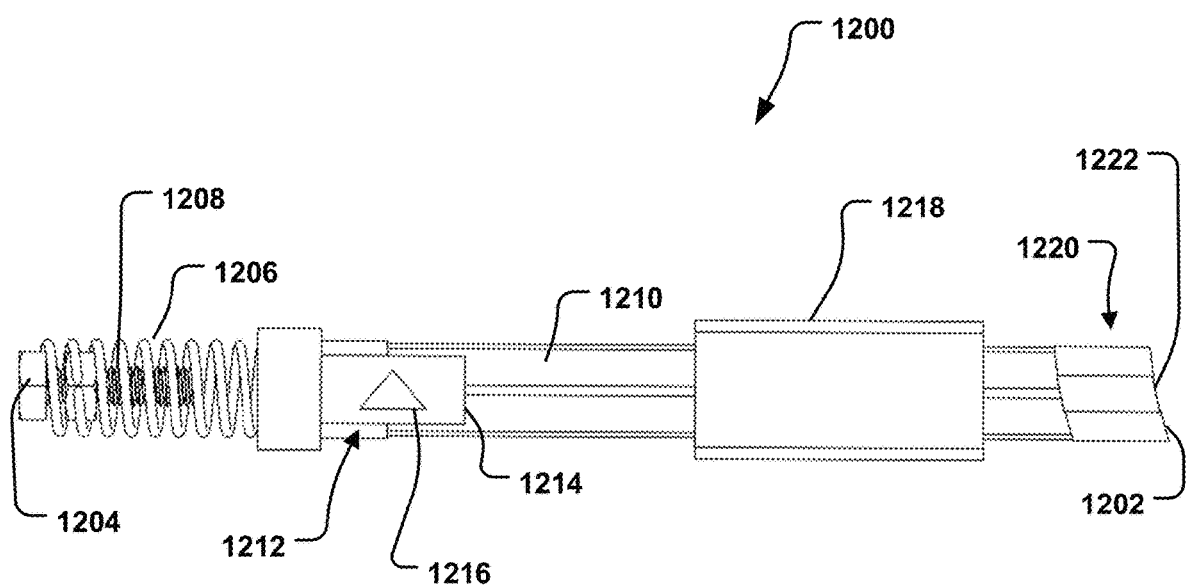
FIG. 13 is a side view of the wire spool brake of FIG. 12.
Figure 14:
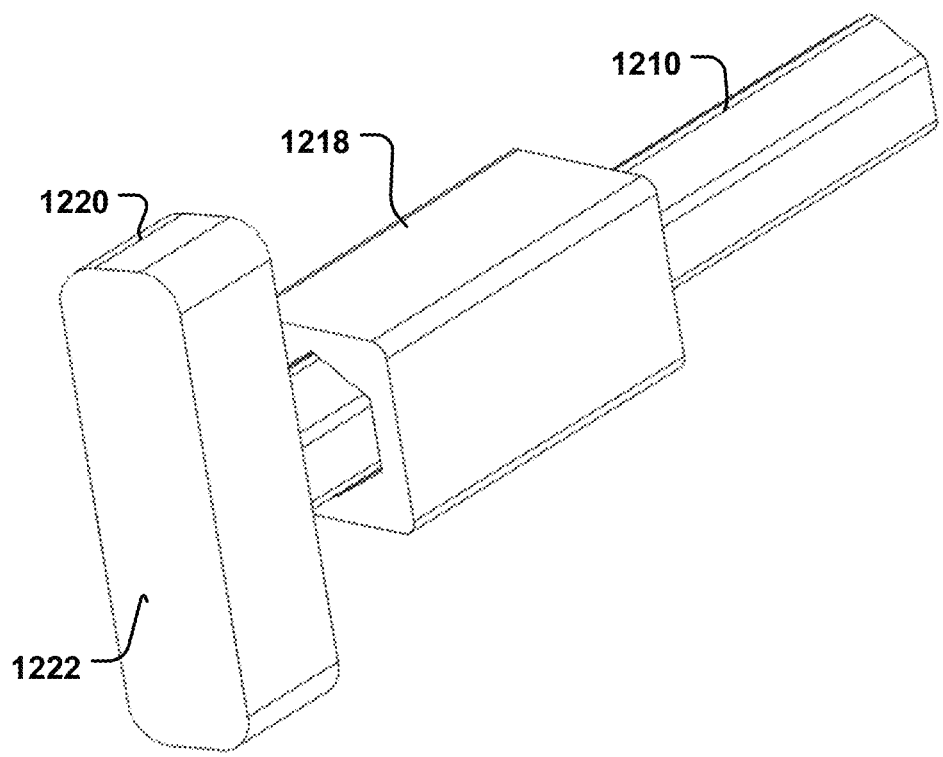
FIG. 14 is a perspective view of an engagement portion of the wire spool brake of FIG. 12.
Figure 15:
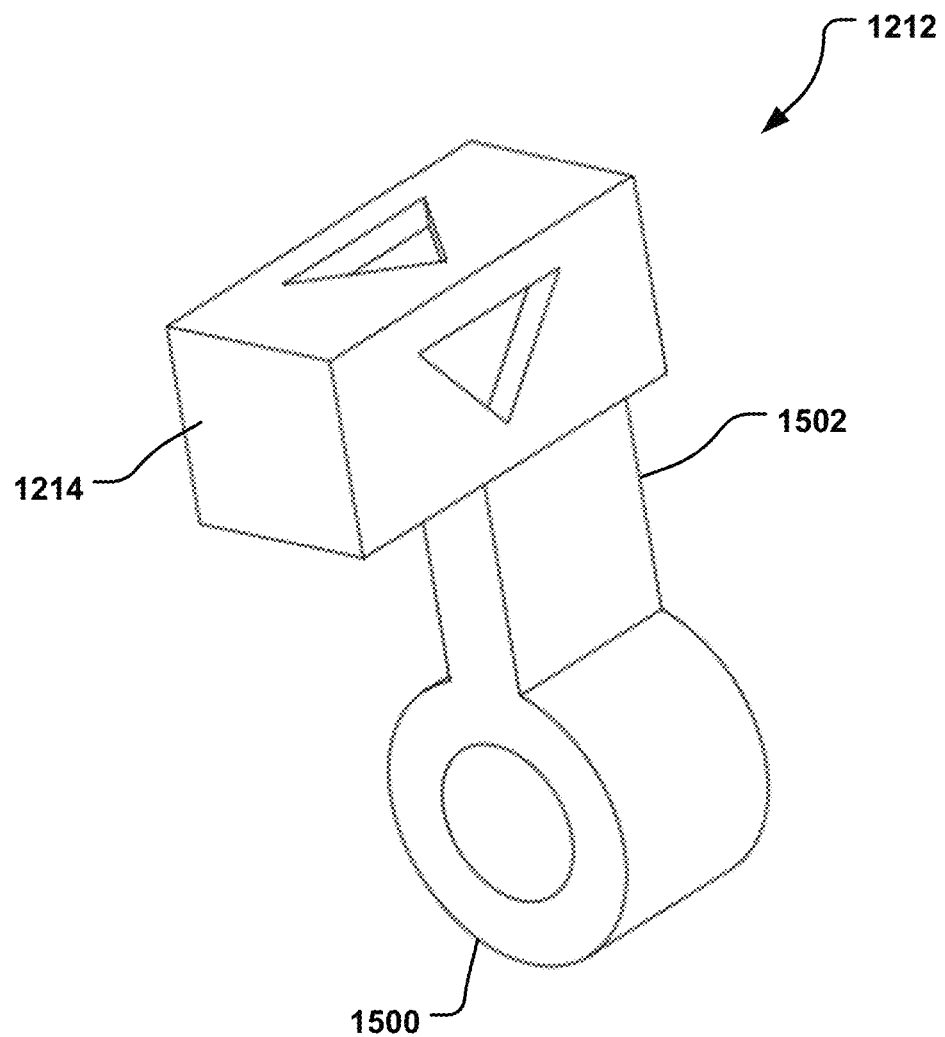
FIG. 15 is a perspective view of a spool brake lock of the wire spool brake of FIG. 12.

FIG. 12 shows the spool brake removed from the armature, as spool brake 1200. The spool brake 1200 has an elongate configuration having a first end 1202 and an opposite second end 1204. The spool brake 1200 includes: a compression spring 1206, a compression spring guide 1208, a spool brake arm 1210, a spool brake lock 1212 that includes a spool brake block 1214 and, in some implementations, a spool life indicator 1216. The spool brake 1200 also includes a brake alignment guide 1218 for receiving the arm 1210 therethrough and a pressure plate 1220 connected to the arm 1210, the pressure plate 1220 defining the first end 1202 of the spool brake 1200.

Compression spring 1206 provides the force within the spool brake 1200 to act against the angular momentum of the welding wire spool as it turns (unwinds). Because the welding wire is wound circumferentially around the wire spool, as the wire is used, the diameter of the wire spool is constantly decreasing. Due to the nature and derivation of the mechanical spring force, the compression spring 1206 will exert the most force, thus producing the most frictional force against the angular momentum of the turning wire spool when the spool has the most mass (which is a new spool with the potential to develop the most angular momentum) due to large spool diameter and high spring compression. In turn, the compression spring 1206 will exert the least frictional force against the angular momentum of the turning wire spool when the spool has the least mass (depleted spool with the least potential to develop angular momentum) due to the small spool diameter and low spring compression.

The compression spring guide 1208 is located proximate the second end 1204 of the spool brake 1200. This guide 1208 is aligned with the central long axis of the spool brake 1200 and serves to keep the compression spring 1206 from binding and/or contorting out of alignment with the axis. The guide 1208 may be in the form of a pin or bolt present within the coils of the compression spring 1206.

The arm 1210, connected to the pressure plate 1220, is operably connected to the compression spring 1206 and moves axially along the central long axis of the spool brake 1200 in the armature 120, e.g., as urged by the compression spring 1206. The arm 1210 is an elongate shaft, of essentially any cross-section shape, attached to the pressure plate 1220 that extends orthogonal to the central long axis of the arm 1210 and the brake 1200. The pressure plate 1220 includes a concave terminal face 1222 that simulates the curvature of the wire on the spool and has a width similar to, but no greater than, the width of the wire spool. Axial movement of the arm 1210 is guided by the guide 1218.

When installed in the spool gun 100 having a spool of wire in the wire housing 106, the face 1222 of the pressure plate 1220 is pressed into the side of the spool (e.g., turning spool) by the compression spring 1206. The contact of the pressure plate 1220 against the wire spool produces mechanical friction that acts against the angular momentum of the turning wire spool. By having the pressure plate 1222 nearly as wide as the internal width of the wire spool, the pressure plate 1222 contacts a maximum number of exposed surface wraps of wire; this holds more, if not all, exposed wire wraps in place, e.g., when installing a new spool of wire to inhibit and preferably prevent catastrophic unfurling of the spool, as well as spread the force from the pressure plate 1222 against many wire wraps to inhibit localized wire deformation.

Figure 11:
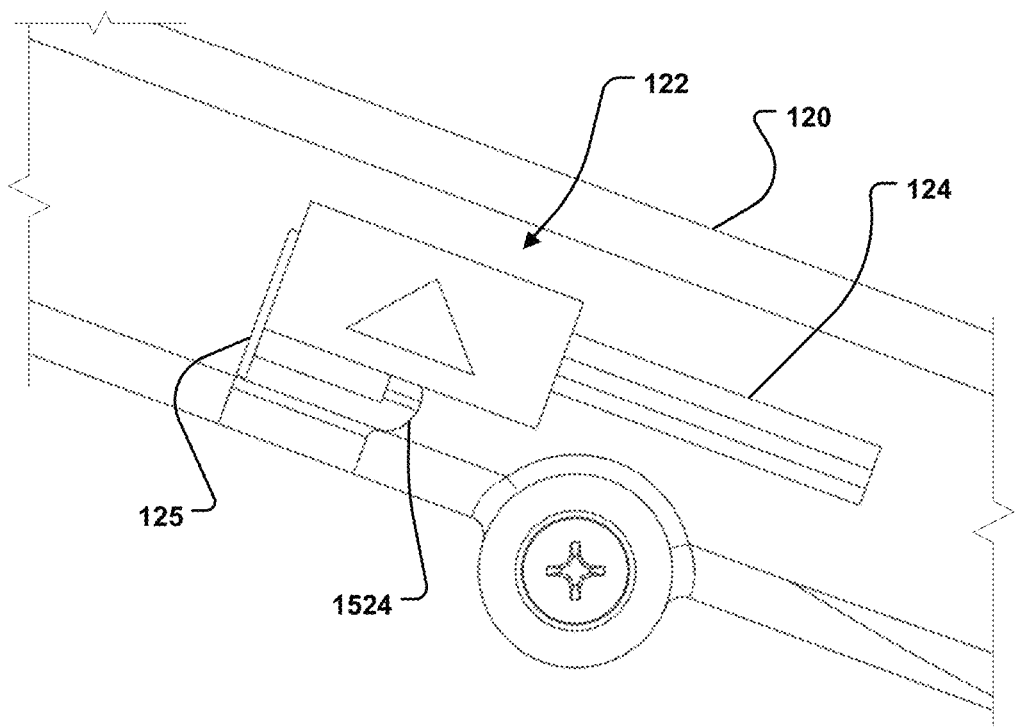
FIG. 11 is an enlarged side view of a wire spool brake of the wire spool gun of FIG. 1.

As seen in FIG. 11, the spool brake lock 1212 is held between the arm 1210 and the compression spring 1206, and in some implementations, can rotate about the central long axis of the spool brake 1200. Seen best in FIG. 14, the spool brake lock 1212 has a, e.g., hollow tube-like, structure 1500 through which a fastener mounts it to the end of the spool brake arm 1210 opposite of the pressure plate 1220. An extension 1502 extends from the tube structure 1500 supporting the block 1214, which is of sufficient size to be manipulated by a user during operation. When the brake lock 1212 is installed on the spool brake 1200 in the armature 120, the extension 1502 protrudes from the spool brake 1200 and rides in a slot 124 (FIG. 1, FIG. 10) present in and along the armature 120.

When the spool brake 1200 is actively acting against the angular momentum of a rotating welding wire spool, the spool brake lock 1212 is located at a position along the slot 124. Its exact position along the slot 124 is determined by the diameter of the welding wire spool at any given time. When the user wishes to de-activate the spool brake 1200 (i.e., release it from contact with the wire spool), the brake 1200 is locked away by sliding the lock 1212 (pushing against the block 1214 and counteracting the compression spring 1206) until it contacts the terminus 125 (FIG. 10) of the slot 124. Once this position is achieved, the spool brake lock 1212 can be rotated about the central long axis of the spool brake 1200 such that the extension 1502 enters a notch 1524 (FIG. 10) located proximate the end of the slot 124. Once the extension 1502 is in this notch 1524, the spool brake 1200 (though being acted upon by the force of the compression spring 1206) is inhibited from moving into its natural un-compressed position. The user is now free to manipulate the wire spool without needing to apply constant force against the spool brake due to the spool brake 1200 being locked.

As indicated above, when the spool brake 1200 is actively acting against the angular momentum of a rotating wire spool, the spool brake lock 1212 is located positionally along the slot 124 in the armature 120. Its exact position along the slot 124 is determined by the diameter of the welding wire spool at any given time. Because of this, the position of the spool brake lock 1212 can be used as an approximation of the amount of welding wire remaining on the spool. An indicator 116, such as a triangular shape, an arrow, a line, a detent, an indent, etc. may be present on the spool brake lock 1212 that points to a scale exhibited on the armature 120. The scale provides a rough indication of the amount of wire remaining on the spool, the indication as e.g., fraction, percentage, diameter of wire on spool, length of wire remaining on spool, etc.

To install a new spool of welding wire in the spool gun 100, the following procedure can be followed:
1) The welding wire spool compartment cover 500 is removed by turning the handle 800, e.g., a quarter-turn counterclockwise, and the secondary member 700 is disengaged and withdrawn from the axle 600.

2) The spool brake 1200 is locked out of the way, by lacing the brake lock 1212 in the slot 124.
3) A spool of welding wire is installed onto the wire spool axle 600.
4) The spool brake 1200 is engaged, with the pressure plate 1220 seating against the wraps of wire on the spool.
5) The user feeds the free end of the wire into the wire inlet guide 900.
6) The wire spool compartment cover 500 is replaced and the handle 800 is used to insert and engage the secondary member 700 with the axle 600.

Although the spool brake 1200 has been shown and described as being within the armature 120, in alternate implementations the spool brake 1200 can be positioned in the handle portion 104 or other element of a spool gun that is connected to or otherwise engages or interacts with the interior of the spool housing.

Figure 16:
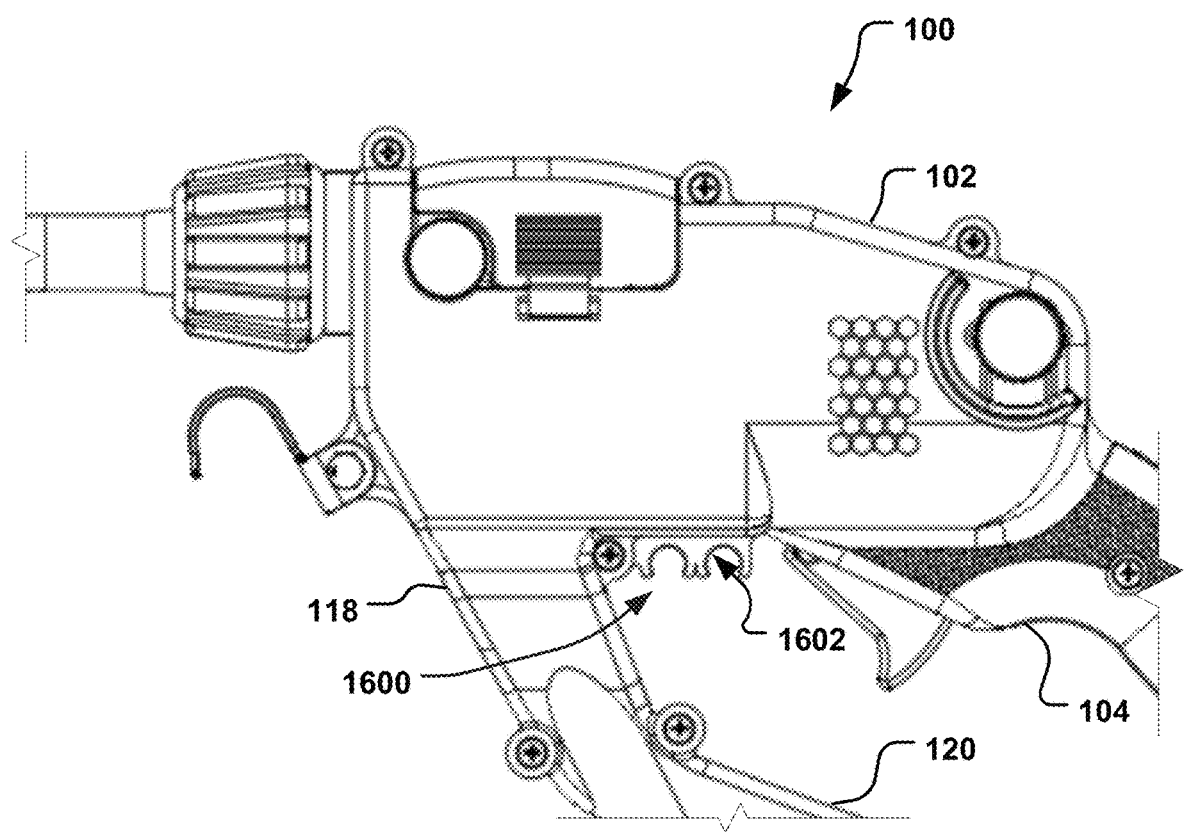
FIG. 16 is an enlarged side view of a portion of the spool gun of FIG. 1.

It is common for welding consumables (particularly, contact tips) to need to be replaced either during or before or after use of the spool gun 100. To facilitate replacement of contact tips by providing replacement tips readily available, the spool gun 100 includes an integrated contact tip storage region 1600, seen in FIG. 16, which includes at least one receptacle 1602 for receiving and retaining a contact tip therein. The receptacle(s) 1602 can be molded directly into the spool gun body portion 102 and closely mimic the external geometry of conventional (e.g., cylindrical) contact tips. The tip storage receptacle(s) 1602 are slightly smaller in diameter than a cylindrical contact tip, at least at their open end, such that when a contact tip is pressed into place by the user, the receptacle(s) 1602 flex around the external tip geometry. Once a contact tip is fully seated in place, the receptacle(s) 1602 snap around the tip, closely mimicking their original undeformed geometry tightly gripping the contact tips.

The spool gun 100 and variations thereof are easily upgradeable due to various modular features. Traditionally, spool guns are rated for a specific maximum electric current output (e.g., 150A, 220A, 300A, etc.). This maximum output is based on the available amount of current carrying material within the welding circuit. Because all materials have a natural resistance to electric current flow, as materials carry electric current, they transform some of the current into heat. The current ratings are based on the ability of a traditional spool gun to carry current for a given period of time without producing excess heat that could result in injury or component failure. The main components that limit the current rating of traditional spool guns are generally the gas/power input cable, the torch neck, and the manifold that connects the two.

In the spool gun 100, the connection manifold 408 (FIG. 4) is designed to carry sufficient current to accommodate a range of gas/power input cables 406 and torch necks 402. To upgrade the current rating of the spool gun 100, the only modifications would be to replace the gas/power input cable 406 and the torch neck 402, both of which are designed to be easily removable from the manifold 408.

Thus, numerous features of the spool gun have been described above and detailed in the attached figures. The above specification and examples provide a complete description of the structure and use of exemplary implementations of the spool gun. The above description provides specific implementations. It is to be understood that other implementations are contemplated and may be made without departing from the scope or spirit of the present disclosure. It is also to be understood that one or more of the features described and/or detailed herein may be incorporated into a spool gun without requiring any or all of the other features described and/or detailed herein. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the spool gun can be made without departing from the spirit and scope of the invention, the invention resides in the claims hereinafter appended. Furthermore, structural features of the different implementations may be combined in yet another implementation without departing from the recited claims.

What is claimed is:

1. A spool gun having a distal end configured to be positioned away from the user when the spool gun is in use and a proximal end configured to be positioned proximate the user when the spool gun is in use, the spool gun comprising:
   a body portion enclosing a wire feed subsystem;
   a handle portion having a first end connected proximal to the body portion and extending to the proximal end of the spool gun;
   a welding torch manifold proximal to the body portion; and
   a gas and power cable inlet connected to the manifold and positioned between the handle portion and the welding torch manifold.

2. The spool gun of claim 1, wherein the wire feed subsystem includes a drive motor and a wire feed mechanism.

3. The spool gun of claim 1, wherein the wire feed subsystem is proximal to the gas and power cable inlet.

4. The spool gun of claim 3, wherein the wire feed subsystem is between the gas and power cable inlet and the handle portion.

5. The spool gun of claim 1, wherein the gas and power cable inlet is positioned between the wire feed subsystem and the welding torch manifold.

6. The spool gun of claim 1 further comprising a spool housing at a second end of the handle opposite the first end, the spool housing having an interior and a removable cover providing access to the interior.

7. The spool gun of claim 1 further comprising a welding tip at the distal end of the spool gun, the welding tip connected to the welding torch manifold.

8. The spool gun of claim 1 further comprising a wire feed trigger proximate the handle portion, operably connected to the wire feed subsystem, the trigger positioned between the handle portion and the gas and power cable inlet.

9. A spool gun having a distal end configured to be positioned away from the user when the spool gun is in use and a proximal end configured to be positioned proximate the user when the spool gun is in use, the spool gun comprising:
    a body portion enclosing a wire feed subsystem;
    a handle portion having a first end connected proximal to the body portion and extending to a wire spool housing at the proximal end of the spool gun;
    an armature connecting the spool housing to the body portion;
    a welding torch manifold proximal to the body portion; and
    a gas and power cable inlet connected to the manifold.

10. The spool gun of claim 9, wherein the wire feed subsystem includes a drive motor and a wire feed mechanism.

11. The spool gun of claim 9, wherein the wire feed subsystem is proximal to the gas and power cable inlet.

12. The spool gun of claim 9, wherein the gas and power cable inlet is positioned between the handle portion and the welding torch manifold.

13. The spool gun of claim 9, wherein the wire feed subsystem is between the gas and power cable inlet and the handle portion.

14. The spool gun of claim 9 further comprising a welding tip at the distal end of the spool gun, the welding tip connected to the welding torch manifold.

15. The spool gun of claim 9 further comprising a wire feed trigger proximate the handle portion, operably connected to the wire feed subsystem, the trigger positioned between the handle portion and the gas and power cable inlet.

16. A spool gun having a distal end configured to be positioned away from the user when the spool gun is in use and a proximal end configured to be positioned proximate the user when the spool gun is in use, the spool gun comprising:
    a body portion enclosing a wire feed subsystem;
    a handle portion having a first end connected proximal to the body portion and extending to a wire spool housing at the proximal end of the spool gun;
    a wire feed trigger proximate the handle portion operably connected to the wire feed subsystem and the wire spool housing;
    an armature connecting the spool housing to the body portion;
    a welding torch manifold proximal to the body portion; and
    a gas and power cable connected to the manifold,
    wherein when the spool gun is in use, the spool gun has a center of gravity located no more than three inches proximal to the wire feed trigger.

17. The spool gun of claim 16, wherein the center of gravity is no more than two inches proximal to the wire feed trigger.

18. The spool gun of claim 16, wherein the center of gravity is within the handle portion.

19. The spool gun of claim 16, wherein the gas and power cable is connected to the body distal to the wire feed trigger.

* * * * *